United States Patent [19]

Koster et al.

[11] 4,038,221

[45] July 26, 1977

[54] PROCESS FOR THE PRODUCTION OF COLD HARDENING FOAMS CONTAINING URETHANE GROUPS BY IN-MOLD FOAMING

[75] Inventors: Johan Bernhard Koster, Stuerzelberg; Hans Joachim Meiners, Leverkusen-Schlebusch; Hans Heinrich Moretto, Leverkusen, all of Germany

[73] Assignee: Bayer Aktiengesellschaft, Leverkusen, Germany

[21] Appl. No.: 632,422

[22] Filed: Nov. 17, 1975

[30] Foreign Application Priority Data

Nov. 20, 1974 Germany .............................. 2454054

[51] Int. Cl.$^2$ ................................................ C08J 9/00
[52] U.S. Cl. ........................... 260/2.5 AH; 260/2.5 A; 260/2.5 BD; 260/2.5 AW
[58] Field of Search .................... 260/2.5 AH, 2.5 AC

[56] References Cited

U.S. PATENT DOCUMENTS

| 3,620,984 | 11/1971 | Dahm et al. ................... 260/2.5 AC |
| 3,993,606 | 11/1976 | Bonin et al. ................... 260/2.5 AC |

FOREIGN PATENT DOCUMENTS

| 1,090,589 | 11/1967 | United Kingdom .......... 260/2.5 AC |

Primary Examiner—Lewis T. Jacobs
Attorney, Agent, or Firm—Gene Harsh; Joseph C. Gil; William F. Parry

[57] ABSTRACT

This invention relates to a process for the making of cold-hardening foams containing urethane groups by in-mold foaming. The need to use a relatively large number of additives like emulsifiers, stabilizers and activators can be eliminated by using certain silicon compounds of a specific formula. Foamable reaction mixtures using these compounds with polyethers, polyisocyanates, water and/or organic blowing agents, and catalysts will produce foams with properties acceptable for use in upholstery, cars, and furniture.

9 Claims, No Drawings

PROCESS FOR THE PRODUCTION OF COLD HARDENING FOAMS CONTAINING URETHANE GROUPS BY IN-MOLD FOAMING

BACKGROUND OF THE INVENTION

Foams containing urethane groups obtained by reacting polyisocyanates with polyols are widely used in the field of insulation, for the manufacture of structural components and for upholstery purposes.

It is known that cold-hardening foams containing urethane groups can be produced in molds from compounds containing active hydrogen atoms, preferably polyols, and polyisocyanates, water and/or other blowing agents in the presence of emulsifiers, auxiliaries, catalysts and flameproofing additives. The object of including the emulsifiers and stabilizers in the reaction mixture is to homogenize the reaction components, to facilitate immediate foaming and to prevent the foams from collapsing on completion of gas formation. The catalysts are intended to ensure that the reactions which take place during foam formation are brought to the required equilibrium and take place at the correct rate.

Cold-hardening foams containing urethane groups which have the requisite physical foam properties are often produced from polyethers containing at least two hydroxyl groups, in which at least 10% of the OH-groups present are primary OH-groups. Such polyethers preferably have molecular weights of from about 750 to 100,000, preferably from 4000 to 10,000, and can be used in combination with "special" polyisocyanates.

Examples of these special polyisocyanates are the so-called "modified polyisocyanates", such as solutions of polyisocyanates containing biuret groups in polyisocyanates free from biuret groups or solutions of polyisocyanates containing at least two NCO groups and at least one N,N'-disubstituted allophanic acid ester group in polyisocyanates free from allophanic acid ester groups. Other kinds of modified polyisocyanates include solutions of reaction products of diisocyanates and divalent or polyvalent compounds containing hydroxyl groups in polyisocyanates free from urethane groups; and solutions of polyisocyanates containing more than one NCO-group and at least one isocyanuric acid ring in polyisocyanates free from isocyanurate groups or any mixture of these solutions.

The above mentioned cold-hardening foams have a disadvantage in that they show faults in the form of bubbles below the surface of the foam which can also spread into the interior of the molding. This is particularly true during in-mold foaming. This is a particularly unfavorable phenomenon both for the furniture industry and for the motor vehicle industry because the bubbles thus formed are distinctly visible in fine covering materials. It is not possible to eliminate these faults by using standard commercial-grade polysiloxane-/polyalkylene oxide copolymers, because irreversible shrinkage occurs, even in the presence of very small quantities of stabilizers. Thus, foams result which are totally unsuitable for practical application.

Until now, a relatively large number of additives such as emulsifiers, stabilizers and various activators for the blowing and crosslinking reaction, have had to be used in the production of these cold-hardening molded foams. Such methods are necessary to produce the required properties such as an open-pore structure, favorable skin texture, uniform cell structure, high tensile strength, elasticity and loadbearing strength without permanent deformation. This can lead to a number of practical difficulties, such as the chemical incompatibility of the additives with each other, or the incompatibility of the additives with the polyols and/or isocyanates used for foaming. One large difficulty is the frequent insolubility of the additives in the polyols which results in inadequate stability during storage as a result of so-called exudation. Another disadvantage common to the numerous additives is their limited effectiveness in a certain recipe. In the event of a change in recipe, different additives or a greater number of additives have to be used.

DESCRIPTION OF THE INVENTION

It has now been found that non-shrinking cold-hardening foams containing urethane groups can be produced by in-mold foaming by a process which is based on the use of certain silicon compounds in order to obviate the disadvantages referred to above.

Accordingly, the present invention relates to a process for the production of cold-hardening, non-shrinking open-pored foams containing urethane groups by foaming in a mold a mixture of polyethers having at least two hydroxyl groups and molecular weights in the range from 750 to 100,000, polyisocyanates, water and/or organic blowing agents, catalysts, silicon compounds and, optionally, other additives, distinguished by the fact that the silicon compounds used correspond to the general formula:

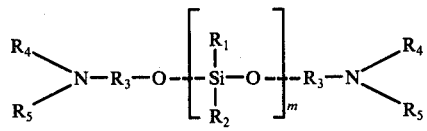

in which
$R_1$ and $R_2$ represent a substituted or unsubstituted monovalent hydrocarbon group, preferably a $C_1$–$C_6$ alkyl group or a $C_6$–$C_8$ aryl group,
$R_3$ represents a divalent organic group, and preferably a $C_2$–$C_{20}$ alkylene group,
$R_4$ and $R_5$ represent a substituted or unsubstituted monovalent hydrocarbon group, in addition to which
$R_4$ and $R_5$ may together form an alkylene ring optionally interrupted by heteroatoms. Preferably $R_4$ and $R_5$ represent a $C_1$–$C_6$ alkyl group or a $C_5$–$C_{10}$ cycloalkylene radical, and
$m$ is an integer from 1 to 20, these silicon compounds being used in quantities of from about 0.01 to about 5% by weight and preferably in quantities of from about 0.05 to about 2.0% by weight, based on the quantity of polyether used.

The groups $R_1$ and $R_2$ in the above formula may be, for example, alkyl, aryl, aralkyl, alkaryl, alkenyl, cycloalkyl or cycloalkenyl groups. Suitable groups are, for example, methyl, ethyl, propyl, butyl, hexyl, phenyl, tolyl, benzyl, phenylethyl, vinyl, allyl and cyclohexyl. $R_1$ and $R_2$ are preferably methyl groups.

The divalent organic group $R_3$ may be an alkylene, arylene, aralkylene, alkarylene or cycloalkylene.

$R_3$ is preferably an alkylene group, most preferably a $C_2$–$C_{20}$ alkylene group, such as, ethylene, 1,3-propylene, 1,4-butylene, 2-methyl-1,3-propylene and 1,11-undecylene.

The groups $R_4$ and $R_5$ may be monovalent hydrocarbon groups such as an alkyl, aryl, aralkyl, alkaryl or cycloalkyl, for example, methyl, ethyl, propyl, butyl, hexyl, phenyl, benzyl, tolyl or cyclohexyl.

In the cases where $R_4$ and $R_5$ are closed to form a ring, they represent a divalent organic group. This group may be interrupted by oxygen and/or nitrogen atoms.

Suitable groups are, for example, butylene, pentylene, hexylene groups and the radicals:

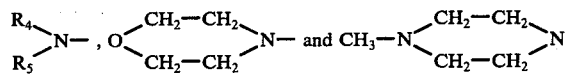

The silicon compounds used in accordance with the invention are known and are obtained in known manner, for example, by reacting chlorosiloxanes known per se corresponding to the general formula:

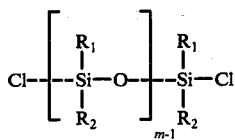

in which
$R_1$, $R_2$ and $m$ are as already defined,
with tertiary amines containing hydroxyl groups and corresponding to the general formula:
$$R_4R_5NR_3OH$$

in which
$R_3$, $R_4$ and $R_5$ are as already defined.

The following are typical examples of the silicon compounds used in accordance with the invention:

---
$[(CH_3)_2NCH_2CH_2O]_2Si(CH_3)_2$
$(CH_3)_2NCH_2CH_2O-(Si(CH_3)_2O)_x-CH_2CH_2N(CH_3)_2$ where x is preferably from 2 to 20
$[(CH_3)_2NCH_2CH_2O]_2Si(C_6H_5)_2$

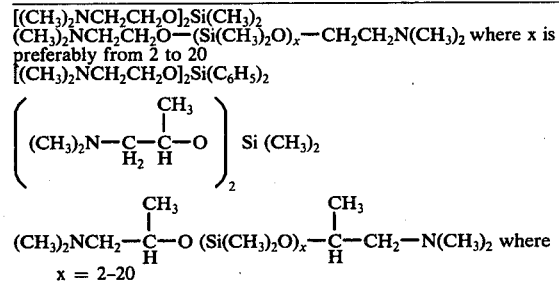

---

The silicon compounds used in accordance with the invention have surprisingly been found to afford the following advantages:

1. The silicon compound used in accordance with the invention are soluble in the polyols used, thereby avoiding difficulties in storage. During mixing of the polyols and polyisocyanates, the dissolved additives impart favorable flow properties to the reaction mixture and, in conjunction with excellent nucleus formation, promote the production of foams by molding with long flow paths. This in turn provides for optimum production. In addition, the stability of the reaction mixture is improved and, on completion of foaming, a finely developed cell structure is obtained extending to the surface of the foam.

2. Under standard foaming conditions and with standard foam recipes, it is possible to obtain highly elastic moldings having excellent feel. In other words their indentation characteristic is favorably affected.

3. The silicon compounds used in the invention lead to a considerable reduction in the number and quantity of additives which would otherwise normally be used. In particular, the quantity of catalysts, such as, amines, can be considerably reduced (by more than 50%). In addition, there is no longer any need whatever to add conventional foam stabilizers. So called "special" polyisocyanates are also not required.

4. There is a graduated effect of the silicon compounds depending upon the number of siloxy units in the compound. This is of particular advantage. Since the additives of the invention may readily be adapted even to modified recipes.

Starting isocyanates suitable for use in the invention include aliphatic, cycloaliphatic, araliphatic, aromatic and heterocyclic polyisocyanates of the type described, by W. Siefken in Justus Liebigs Annalen der Chemie, 562, pages 75 to 136. Examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate, and mixtures of these isomers; 1-isocyanato-3,3,5-trimethyl-5-isocyanato methyl cyclohexane as described in U.S. Pat. No. 3,401,190; 2,4- and 2,6-hexahydrotolyene diisocyanate, and mixtures of these isomers; hexahydro-1,3- and/or 1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate, and mixtures of these isomers; diphenyl methane-2,4'- and/or -4,4'-diisocyanate; naphthylene-1,5-diisocyanate; triphenyl methane-4,4',4"-triisocyanate; polyphenyl polymethylene polyisocyanates of the type which can be obtained by condensing aniline with formaldehyde followed by phosgenation, and which are described in British Pat. Nos. 874,430 and 848,671; m- and p-isocyanatophenyl sulphonyl isocyanates as described in U.S. Pat. No. 3,454,606; perchlorinated aryl polyisocyanates of the type described in U.S. Pat. No. 3,277,138; polyisocyanates containing carbodiimide groups of the type described in U.S. Pat. No. 3,152,162; diisocyanates of the type described in U.S. Pat. No. 3,492,330; polyisocyanates containing allophanate groups of the type described in British Pat. No. 994,890, Belgian Pat. No. 761,626 and published Dutch Pat. Application No. 7,102,524; polyisocyanates containing isocyanurate groups of the type described in U.S. Pat. No. 3,001,973, in German Pat. Nos. 1,022,789; 1,222,067 and 1,027,394, and in German Offenlegungsschrifts 1,929,034 and 2,004,048; polyisocyanates containing urethane groups of the type described in Belgian Pat. No. 752,261 or in U.S. Pat. No. 3,394,164; polyisocyanates containing acylated urea groups of the type described in German Pat. No. 1,230,778; polyisocyanates containing biuret groups of the type described in U.S. Pat. Nos. 3,124,605 and 3,201,372 and in British Pat. No. 889,050; polyisocyanates obtained by telomerization reactions of the type described in U.S. Pat. No. 3,654,106; polyisocyanates containing ester groups of the type described in British Pat. Nos. 965,474 and 1,072,956, in U.S. Pat. No. 3,567,763 and in German Pat. No. 1,231,688, reaction products of the abovementioned isocyanates with acetals as described in German Pat. No. 1,072,385, and polyisocyanates containing polymeric fatty acid radicals as described on U.S. Pat. No. 3,455,883.

It is also possible to use the isocyanate-group-containing distillation residues accumulating in the production of isocyanates on a commercial scale, optionally in solution in one or more of the aforementioned polyisocyanates. It is also possible to use mixtures of any of the aforementioned polyisocyanates.

In general, it is particularly preferred to use readily available polyisocyanates, such as, 2,4- and 2,6-tolylene diisocyanate and mixtures of these isomers ("TDI"); polyphenyl polymethylene polyisocyanates of the type obtained by condensing aniline with formaldehyde followed by phosgenation ("crude MDI"); and polyisocyanates containing carbodiimide groups, urethane groups, allophanate groups, isocyanurate groups, urea groups or biuret groups ("modified polyisocyanates").

Monofunctional isocyanates, such as propyl isocyanate, cyclohexyl isocyanate, phenyl isocyanate, tolyl isocyanate, p-chlorophenyl isocyanate and the like may also form part of the combination of isocyanates used in accordance with the invention. However, they should generally not constitute any more than 20% by weight of the isocyanate combination used, based on the isocyanate content.

Other suitable starting materials for the process according to the invention are polyethers containing at least two, generally two to eight and preferably two or three hydroxyl groups, generally with molecular weights in the range from 750 to 100,000. Polyethers of this kind, which are known per se, are obtained, for example, by the polymerization of epoxides with ethylene oxide, propylene oxide, butylene oxide, tetrahydrofuran, styrene oxide or epichlorhydrin on their own, for example, in the presence of boron trifluoride, or by the chemical addition of these epoxides, optionally in admixture or in succession, to starter components containing reactive hydrogen atoms, such as water, alcohols or amines. Examples of these starter compounds include ethylene glycol, 1,3- or 1,2-propylene glycol, trimethylol propane, 4,4'-dihydroxy diphenyl propane, aniline, ammonia, ethanolamine and ethylene diamine. In many cases, it is preferred to use polyethers of the kind containing predominant amounts of primary OH-groups (up to 90% by weight, based on all the OH-groups present in the polyether). Polyethers modified by vinyl polymers of the type formed, for example, by polymerizing styrene or acrylonitrile in the presence of polyethers, (U.S. Pat. Nos. 3,383,351; 3,304,273; 3,523,093 and 3,110,695; German Pat. No. 1,152,536), are also suitable, as are polybutadienes containing OH-groups.

Polythioethers, may also be used in the invention. In particular, the condensation product of thiodiglycol with itself and/or with other glycols, dicarboxylic acids, formaldehyde, amino carboxylic acids or amino alcohols may be used. The products in question are polythio mixed ethers, polythioether esters or polythioether ester amides, depending upon the co-components.

The above-mentioned polyethers may also be modified by reaction with less than equivalent quantities of polyisocyanates.

The relatively high molecular weight polyethers used in accordance with the invention may also be used in admixture with low molecular weight compounds having active hydrogen atoms and molecular weights of up to 750, or in admixture with (up to 50% by weight, based on the polyethers) other relatively high molecular weight compounds containing active hydrogen atoms. Particularly suitable low molecular weight compounds having active hydrogen atoms are compounds containing hydroxyl groups, for example, ethylene glycol, 1,3-butylene glycol, 1,4-butylene glycol, glycerol, trimethylol propane, castor oil. Also suitable are adducts (molecular weights of generally from 200 to 750) of alkylene oxides such as, ethylene oxide, propylene oxide or butylene oxide, with low molecular weight compounds containing active hydrogen atoms of the type in question or with water. Other relatively high molecular weight compounds containing active hydrogen atoms are compounds known per se such as polyesters, polyacetals, polyethers, polyester amides and polycarbonates.

Examples of suitable polyacetals are the compounds which can be obtained from glycols, such as diethylene glycol, triethylene glycol, 4,4'-dioxethoxy diphenyl dimethyl methane, hexane diol and formaldehyde. Polyacetals suitable for use in the invention can also be obtained by polymerizing cyclic acetals.

Suitable polycarbonates containing hydroxyl groups are those known per se which can be obtained, for example, by reacting diols such as 1,3-propane diol, 1,4-butane diol and/or 1,6-hexane diol, diethylene glycol, triethylene glycol, tetraethylene glycol, with diaryl carbonates (for example, diphenyl carbonate) or phosgene.

The polyester amides and polyamides include compounds such as the predominantly linear condensates obtained from polyhydric saturated and unsaturated amino alcohols, diamines, polyamines and mixtures thereof.

Polyhydroxy compounds already containing urethane or urea groups, and optionally modified natural polyols such as castor oil, carbohydrates, starch, can also be used. Addition products of alkylene oxides with phenol-formaldehyde resins or even with urea-formaldehyde resins, can also be used.

Examples of the may type of compounds usable in the instant invention are described, for example, in High Polymers, Vol. XVI, "Polyurethanes, Chemistry and Technology", by Saunders-Frisch, Interscience Publishers, New York, London, Vol. I, 1962, pages 32 to 42 and pages 44–54, and Vol. II, 1964, pages 5 to 6 and 198 to 199, and in Kunststoff-Handbuch, Vol. VII, Vieweg-Hochtlen, Carl-Hanser-Verlag, Munich, 1966, pages 45 to 71.

According to the invention, water and/or readily volatile organic substances are used as blowing agents. Examples of suitable organic blowing agents include acetone; ethyl acetate; halogen-substituted alkanes such as methylene chloride, chloroform, ethylidene chloride, vinylidene chloride, monofluorotrichloromethane, chlorodifluoromethane, dichlorodifluoromethane and the like; butane; hexane; heptane; diethyl ether; and the like. A blowing effect can also be obtained by adding compounds which decompose at temperatures above room temperature giving off gases such as nitrogen. Azo compounds such as azoisobutyronitrile can be used for this purpose. Further examples of blowing agents and information as to the use of blowing agents may be found in Kunststoff-Handbuch, Vol. VII, Vieweg and Hochtlen, Carl-Hanser-Verlag, Munich, 1966, for example on pages 108 and 109, 453 to 455 and 507 to 510.

In many cases, catalysts are also used in accordance with the invention. Suitable catalysts are catalysts known per se, for example, tertiary amines such as triethylamine, tributylamine, N-methyl morpholine, N-ethyl morpholine, N-cocomorpholine, N,N,N',N'-tetramethyl ethylene diamine, 1,4-diaza bicyclo-(2,2,2)- octane, N-methyl-N'-dimethyl amino ethyl piperazine, N,N-dimethyl benzylamine, bis-(N,N-diethyl aminoethyl)-adipate, N,N-diethyl benzylamine, pentamethyl diethylene triamine, N,N-dimethyl cyclohexylamine, N,N,N',N'-tetramethyl-1,3-butane diamine, N,N-dimethyl-β-phenylethyl amine, 1,2-dimethyl imidazole and 2-methyl imidazole. Other suitable catalysts are Mannich bases of secondary amines known per se, such as those of dimethyl amine and aldehydes, preferably formaldehyde, or ketones such as acetone, methylethyl ketone or cyclohexanone, and phenols, such as phenol, nonyl phenol or bis-phenol.

Examples of the tertiary amines containing isocyanate-reactive hydrogen atoms which are used as catalysts are triethanolamine, triisopropanolamine, N-methyl diethanolamine, N-ethyl diethanolamine, N,N-dimethyl ethanolamine and also their reaction products with alkylene oxides such as propylene oxide and/or ethylene oxide.

Other suitable catalysts include sila-amines having carbon-silicon bonds of the type described, for example, in U.S. Pat. 3,620,984, for example, 2,2,4-trimethyl-2-sila morpholine and 1,3-diethylaminomethyl tetramethyl disiloxane.

Other suitable catalysts include nitrogen-containing bases such as tetraalkyl ammonium hydroxides; alkali metal hydroxides such as sodium hydroxide; alkali metal phenolates such as sodium phenolate; or alkali metal alcoholates such as sodium methylate. Hexahydrotriazines may also be used as catalysts.

Organometallic compounds, especially organotin compounds, may also be used as catalysts.

Suitable organotin compounds are tin (II) salts of carboxylic acids such as tin (II) acetate, tin (II) octoate, tin (II) ethyl hexoate and tin (II) laurate; and also the tin (IV) compounds, for example, dibutyl tin oxide, dibutyl tin dichloride, dibutyl tin diacetate, dibutyl tin dilaurate, dibutyl tin maleate or dioctyl tin diacetate. All the catalysts mentioned above may of course also be used in admixture with each other.

Further examples of catalysts suitable for use in the invention and details on the way in which the catalysts work may be found in Kunststoff-Handbuch, Vol. VII, Vieweg and Hochtlen, Carl-Hanser-Verlag, Munich, 1966, pages 96 to 102.

The catalysts are generally used in a quantity of from about 0.001 to 10% by weight, based on the quantity of polyethers containing at least two hydroxyl groups having a molecular weight in the range from 750 to 100,000.

According to the invention, it is also possible to use surface-active additives, such as emulsifiers and foam stabilizers. Examples of suitable emulsifiers are the sodium salts of castor oil sulphonates or salts of fatty acids with amines such as diethylamine oleate or diethanolamine stearate. Alkali or ammonium salts of sulphonic acids, for example, of dodecyl benzene sulphonic acids or dinaphthyl methane disulphonic acid, or of fatty acids such as ricinoleic acid or of polymeric fatty acids, may also be used as surface-active additives.

Particularly suitable foam stabilizers are polyether siloxanes, especially those which are water-soluble. These compounds are generally synthesized in such a way that a copolymer of ethylene oxide and propylene oxide is attached to a polydimethyl siloxane radical. Foam stabilizers of this kind are described in U.S. Pat. Nos. 2,834,748; 2,917,480 and 3,629,308.

According to the invention, it is also possible to use reaction retarders including acid-reacting substances such as hydrochloric acid or organic acid halides; cell regulators known per se such as paraffins or fatty alcohols or dimethyl polysiloxanes; pigments or dyes; flameproofing agents known per se, for example, tris-chloroethyl phosphate, tricresyl phosphate or ammonium phosphate and polyphosphate; stabilizers against ageing and weathering; plasticizers; fungistatic and bacteriostatic compounds; and fillers such as barium sulphate, kieselguhr, carbon black or whiting.

Other examples of surface-active additives, foam stabilizers, cell regulators, reaction retarders, stabilizers, flameproofing agents, plasticizers, dyes, fillers and fungistatic and bacteriostatic compounds, optionally used in accordance with the invention, and also details on the way additives of this kind are used and the way in which they work, can be found in Kunststoff-Handbuch, Vol. VII, Vieweg and Hochtlen, Carl-Hanser-Verlag, Munich 1966, for example, on pages 103 to 113.

According to the invention, the reaction components are reacted by either the one-stage process known per se, by the prepolymer process or by the semi-prepolymer process. In many cases these can be carried out using machines, such as those of the type described in U.S. Pat. No. 2,764,565. Particulars of processing machines which may also be used may be found in Kunststoff-Handbuch, Vol. VII, Vieweg and Hochtlen, Carl-Hanser-Verlag, Munich, 1966, for example, on pages 121 to 205.

According to the invention, the foams are produced by foaming in molds. To achieve this, the reaction mixture is introduced into a mold. Suitable mold materials include metals, such as aluminum, or plastics, such as epoxide resin. In the mold, the foamable reaction mixture foams and forms the molding. In-mold foaming may be carried out in such a way that the molding has a cellular structure over its surface, although it may also be carried out in such a way that the molding has a compact skin and a cellular core. According to the invention, it is possible in this connection to introduce into the mold such a quantity of foamable reaction mixture that the foam formed just fills the mold. However, it is also possible to introduce into the mold more foamable reaction mixture than is required to fill the interior of the mold with foam. This technique is known as "over charging" and is described, for example, in U.S. Pat. Nos. 1,178,490 and 3,182,104.

In many cases, "external release agents" known per se, such as silicone oils, are used during in-mold foaming. However, it is also possible to use so-called "internal release agents", optionally in admixture with external release agents, as known, for example, from German Offenlegungsschrifts 2,121,670 and 2,307,589.

Cold-hardening foams are produced by this invention (cf. British Pat. No. 1,162,517 and German Offenlegungsschrift 2,153,086).

The products obtained by the process of the invention may be used as upholstery materials.

PREPARATION OF THE SILICON COMPOUNDS

I 774 g (6 mols) of distilled dimethyl dichlorosilane in 1 liter of dry chlorobenzene are added dropwise with stirring to 1068 g (12.0 mols) of distilled N,N-dimethyl ethanolamine in 5 liters of dry chlorobenzene, at a slow rate such that the temperature remains between 80° and 90° C. The resulting suspension of crystals of the compound $(CH_3)_2Si(OCH_2CH_2N(CH_3)_2 \cdot HCl)_2$ is then stirred for 2 hours at 100° C.

To recover the free di-(2-N,N-dimethyl ethoxy)-dimethyl silane base, dry ammonia is introduced into the suspension at 80° C. After the ammonium chloride precipitated has been filtered off, the chlorobenzene is distilled off from the filtrate. The compound $(CH_3)_2Si(OCH_2CH_2N(CH_3)_2)_2$, which boils at a temperature between 78° and 82° C under 1 to 3 Torr, is obtained with a theoretical yield of 88%.

II 1950 g (5 mols) of a dichloropolydimethyl siloxane having an average molecular weight of 390 are added dropwise with stirring over a period of 3 hours at 80° to 890 g (10 mols) of distilled N,N-dimethyl ethanolamine in 5 liters of dry chlorobenzene. After stirring for 3 hours at 100° C, dry ammonia is introduced at the aforementioned temperature. The ammonium chloride precipitated is filtered off and the chlorobenzene distilled off from the filtrate. The residue is subjected to thin-layer distillation at 100° C/13 to 15 Torr, giving 2500 g (91% of the theoretical) of a di-(2-N,N-dimethylethoxy)-polydimethyl siloxane having an average molecular weight of 550.

EXAMPLE 1

A 100 parts by weight of a trimethylolpropane-started polypropylene glycol which has been modified with ethylene oxide in such a way that it contains 60% of terminal primary hydroxyl groups to give an OH-number of 28, 3.2 parts by weight of water, 0.15 part by weight of diazabicyclo-2,2,2-octane (catalyst), and

B 0.2 parts by weight of the silicon compound described in I, and 0.1 part by weight of the silicon compound described in II, are mixed and reacted in an enclosed mold with

C 39.0 parts by weight of the isocyanate described below:

20 parts of 1,2-propylene glycol are added at 60° C to a mixture of 225 parts of a mixture of 80% by weight of 2,4- and 20% by weight of 2,6-tolylene diisocyanate and 274 parts of 4,4'-diphenyl methane diisocyanate, followed by reaction for 30 minutes in a metal mold. Following the addition of 1 part of β-phenylethyl ethylene imine, the contents of the mold are heated to 130° C. The trimerization reaction which takes place at this temperature is stopped after 2.5 hours, by the addition of 1 part of p-toluene sulphonic acid methyl ester. At this time, the reaction mixture has an NCO-content of 26.5%. Dilution with 624 parts of an 80/20 mixture of 2,4- and 2,6-tolylene diisocyanate gives a polyisocyanate solution which is characterized by the following values:

| % NCO: | 38.4 |
|---|---|
| $cP_{25°\ C}$: | 24 |
| $n_D^{50}$: | 1.5738 |

A molded foam with the following mechanical properties is obtained:

| gross density | DIN 53420 | (kg/m³) | 43 |
|---|---|---|---|
| tensile strength | DIN 53571 | (KPa) | 130 |
| breaking elongation | DIN 53571 | (%) | 120 |
| compressive strength | DIN 53577 | (KPa) | 3.3 |

EXAMPLE 2

A 100 parts by weight of a trimethylolpropane-started polypropylene glycol which has been modified with ethylene oxide in such a way that it contains 60% by weight of terminal primary hydroxyl groups to give an OH-number of 28, 2.5 parts by weight of water, 0.2 part by weight of diazabicyclo-2,2,2-octane (as catalyst), and

B 0.1 part by weight of the silicon compound described in I, and 0.1 part by weight of the silicon compound described in II, are mixed together and reacted in a mold with

C 40.9 parts by weight of an isocyanate mixture of which 40% by weight consists of a tolylene diisocyanate mixture (2,4- and 2,6-isomers in a ratio by weight of 65:35%) and 60% by weight of a polyphenyl polymethylene polyisocyanate (viscosity approximately 200 cP at 25° C). The polyphenyl polymethylene polyisocyanate was obtained by condensing aniline with formaldehyde, followed by phosgenation.

A molded foam with the following mechanical properties is obtained:

| gross density | DIN 53420 | (kg/m³) | 49.5 |
|---|---|---|---|
| tensile strength | DIN 53571 | (KPa) | 65 |
| breaking elongation | DIN 53571 | (%) | 80 |
| compressive strength | DIN 53577 | (KPa) | 2.7 |

EXAMPLE 3

A 50 parts by weight of a trimethylolpropane-started polypropylene glycol which has been modified with ethylene oxide in such a way that it contains 60% of terminal primary hydroxyl groups to given an OH-number of 28, and 50 parts by weight of a trimethylolpropane-started polypropylene glycol which has been modified with ethylene oxide in such a way that it contains 70% of terminal primary hydroxyl groups and which, in addition, has been grafted with acrylonitrile and styrene in a ratio of 60:40 and has an OH-number of 28.

2.7 parts by weight of water, 0.15 part by water of diazabicyclo-2,2,2-octane (catalyst), 0.08 part by weight of 2,2'-dimethylamino diethyl ether (catalysts), and

B 0.1 part by weight of the silicon compound described in II, are mixed together and reacted in a mold with

C 34.0 parts by weight of a tolylene diisocyanate mixture (2,4- and 2,6-isomers in a ratio by weight of 80:20%) and 20.0 parts by weight of a polyphenyl polymethylene polyisocyanate obtained by condensing aniline with formaldehyde, followed by phosgenation.

A molded foam with the following mechanical properties is obtained:

| gross density | DIN 53420 | (kg/m³) | 42 |
| --- | --- | --- | --- |
| tensile strength | DIN 53571 | (KPa) | 170 |
| breaking elongation | DIN 53571 | (%) | 180 |
| compressive strength | DIN 53577 | (KPa) | 3.9 |

In the above mentioned examples a metal mould was used having a temperature of about 40° C before the foam mixture was introduced. The temperature of the reaction components was about 25° C. The release time was about 10 minutes.

What is claimed is:

1. A process for the production of cold-hardening non-shrinking open-pored foams containing urethane groups by foaming in a mold a mixture comprising A) a polyether having at least two hydroxyl groups and a molecular weight in the range from 750 to 100,000, B) a polyisocyanate, C) a blowing agent, D) a catalyst and E) a silicon compound wherein the silicon compound used corresponds to the general formula

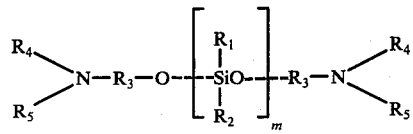

in which
$R_1$ and $R_2$ represents a substituted or unsubstituted monovalent hydrocarbon group,
$R_3$ represents a $C_2$-$C_{20}$ alkylene group,
$R_4$ and $R_5$ represent a substituted or unsubstituted monovalent hydrocarbon group, in addition to which $R_4$ and $R_5$ may together form an alkylene ring which may be interrupted by heteroatoms, and
$m$ is an integer from 1 to 20.

2. The process of claim 1 wherein said silicon compounds are used in quantities from about 0.01 to 5% by weight based on the quantity of polyether used.

3. The process of claim 1 wherein said silicon compounds are used in quantities from about 0.05 to 2% by weight based on the quantity of polyether used.

4. The process of claim 1 wherein $R_1$ and $R_2$ represent $C_1$-$C_6$ alkyl or $C_6$-$C_8$ aryl groups.

5. The process of claim 1 wherein $R_1$ and $R_2$ are methyl groups.

6. The process of claim 1 wherein $R_4$ and $R_5$ represent a $C_1$-$C_6$ alkyl group.

7. The process of claim 1 wherein $R_4$ and $R_5$ represent a $C_5$-$C_{10}$ cycloalkylene radical.

8. The process of claim 1 wherein said blowing agent is water.

9. The process of claim 1 wherein said polyisocyanate is selected from the group consisting of 2,4- and 2,6-tolylene diisocyanate, polyphenyl polymethylene polyisocyanate and polyisocyanates containing carbodiimide, urethane, allophanate, isocyanurate, urea or biuret groups.

* * * * *